United States Patent
Lehmann et al.

(10) Patent No.: US 8,597,763 B2
(45) Date of Patent: Dec. 3, 2013

(54) ELEMENT FOR SEALING OR REINFORCING A CAVITY AND METHOD FOR INTRODUCING A PENETRATING ELEMENT INTO SUCH AN ELEMENT

(75) Inventors: Marco Lehmann, Zurich (CH); Nicolas Brichet, Zurich (CH); Marcel Meister, Hochfelden (CH); Michael Koller, Dottingen (CH)

(73) Assignee: Sika Technology AG, Baar (CH)

( * ) Notice: Subject to any disclaimer, the term of this patent is extended or adjusted under 35 U.S.C. 154(b) by 649 days.

(21) Appl. No.: 12/726,042

(22) Filed: Mar. 17, 2010

(65) Prior Publication Data

US 2010/0253004 A1  Oct. 7, 2010

(30) Foreign Application Priority Data

Apr. 3, 2009 (EP) .................................. 09157281

(51) Int. Cl.
B32B 3/24 (2006.01)
F16J 15/02 (2006.01)
B60R 11/00 (2006.01)
B60R 13/08 (2006.01)
B62D 25/00 (2006.01)

(52) U.S. Cl.
USPC ........ 428/137; 428/99; 428/131; 296/187.01; 296/187.02; 248/71; 248/74.1; 277/314; 277/602; 277/606; 277/616; 277/626; 277/627; 277/637; 277/644; 277/650

(58) Field of Classification Search
None
See application file for complete search history.

(56) References Cited

U.S. PATENT DOCUMENTS

| | | | | |
|---|---|---|---|---|
| 3,164,870 A | * | 1/1965 | Stolarczyk et al. | 49/495.1 |
| 3,954,238 A | * | 5/1976 | Nivet | 248/68.1 |
| 5,266,133 A | | 11/1993 | Hanley et al. | |
| 5,373,027 A | | 12/1994 | Hanley et al. | |
| 6,387,470 B1 | | 5/2002 | Chang et al. | |
| 6,575,051 B2 | * | 6/2003 | Lacroix | 74/502.4 |
| 7,494,179 B2 | * | 2/2009 | Deachin et al. | 296/187.02 |
| 7,726,442 B2 | * | 6/2010 | Belpaire | 181/237 |
| 2004/0182973 A1 | * | 9/2004 | Kawai | 248/71 |
| 2006/0249636 A1 | * | 11/2006 | Thiedig et al. | 248/74.4 |

FOREIGN PATENT DOCUMENTS

| | | |
|---|---|---|
| EP | 0 204 970 B1 | 12/1990 |
| EP | 1 323 588 A1 | 7/2003 |
| WO | WO 97/31415 A2 | 8/1997 |
| WO | WO 01/24989 A1 | 4/2001 |
| WO | WO 01/42055 A1 | 6/2001 |
| WO | WO 2005/080524 A1 | 9/2005 |

OTHER PUBLICATIONS

European Search Report issued in European Patent Application No. 09 15 7281 by the European Patent Office on May 26, 2009. (with English Translation).

* cited by examiner

*Primary Examiner* — David Sample
*Assistant Examiner* — Jeff Vonch
(74) *Attorney, Agent, or Firm* — Oliff & Berridge, PLC

(57) ABSTRACT

In the case of an element for sealing or reinforcing a cavity of a structural element, in particular of a vehicle, the element comprises a base element a foamable part, and an opening for receiving a penetrating element. A wing is arranged on the base element, the opening is open at the side and an actuator which moves the wing when the penetrating element is introduced is arranged on the wing.

17 Claims, 3 Drawing Sheets

ELEMENT FOR SEALING OR REINFORCING A CAVITY AND METHOD FOR INTRODUCING A PENETRATING ELEMENT INTO SUCH AN ELEMENT

TECHNICAL FIELD

The invention is based on an element for sealing or reinforcing a cavity according to the precharacterizing clause of the first claim. The invention is likewise based on a method for introducing a penetrating element into such an element according to the precharacterizing clause of the independent method claim.

PRIOR ART

Structural elements, such as bodies and/or frames of means of transport and means of transportation, in particular of vehicles on water or on land, or of aircraft, often have cavities, in particular to make lightweight constructions possible. However, these cavities cause various problems. Depending on the type of cavity, it must be sealed in order to prevent the ingress of moisture and contamination, which could lead to corrosion of the structural elements. It is often also desirable to reinforce the cavities, and consequently the structural element, significantly, but to retain the light weight. It is often also necessary to stabilize the cavities, and consequently the structural elements, in order to reduce noises which would otherwise be transmitted along the cavity or through it. Many of these cavities have an irregular form or a narrow extent, making it more difficult to seal, reinforce and damp them properly. In particular in automobile construction, sealing elements (baffles) are therefore used to seal and/or acoustically close off cavities, or reinforcing elements (reinforcers) are used to reinforce cavities. If penetrating elements, such as tubes, lines, etc., then have to be led through such sealing elements or reinforcing elements, there are various solutions. In principle, however, all currently known systems are relatively complicated and it is laborious to install the penetrating element in the sealing element. Moreover, it is difficult to ensure sufficient sealing.

SUMMARY OF THE INVENTION

The invention is based on the object of avoiding the disadvantages of the prior art mentioned at the beginning in the case of an element for sealing or reinforcing a cavity and of providing an improved element.

This is achieved according to the invention by the features of the first claim.

The essence of the invention is therefore that a wing is arranged on the base element, that the opening is open at the side, and that a actuator which moves the wing when the penetrating element is introduced is arranged on the wing.

The advantages of the invention can be seen as including the fact that, with the novel element, which is supplied in the opened state, the wing is automatically closed by the actuator when the penetrating element is introduced. Consequently, by contrast with the prior art, only one working step is necessary, which makes installation easier and lowers costs.

Further advantageous refinements of the invention are provided by the subclaims. It is particularly advantageous to make the foamable part of foamable material, so that the penetrating element is entirely enclosed by foam.

BRIEF DESCRIPTION OF THE DRAWING

Exemplary embodiments of the invention are explained in more detail below on the basis of the drawings. Elements that are the same or have the same effect are provided with the same designations in the various figures. The direction of movement of the penetrating element during installation is represented by arrows.

In the drawings.

Only the elements that are essential for the direct understanding of the invention are shown.

WAY OF IMPLEMENTING THE INVENTION

Figure 1:
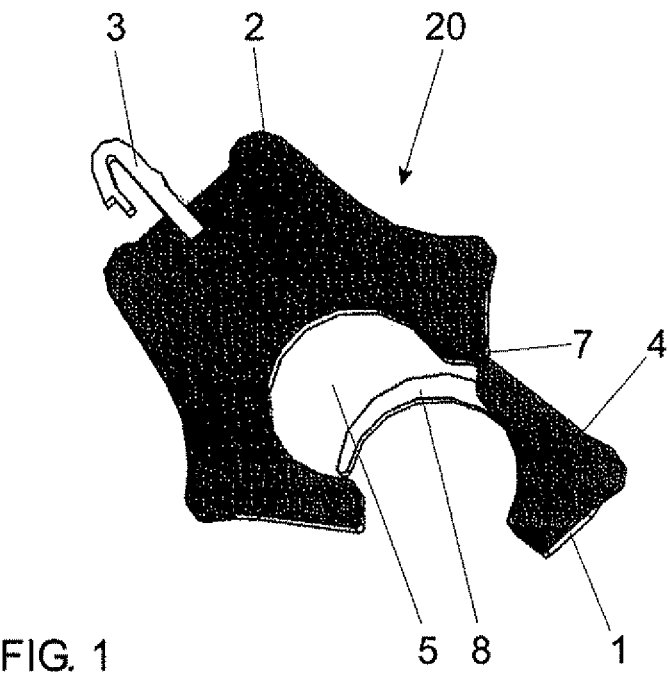
FIG. 1 shows a plan view of an opened sealing element according to the invention.
Figure 2:
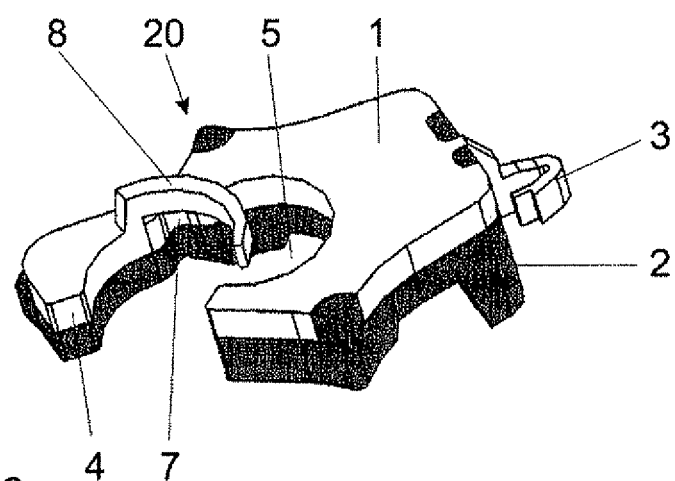
FIG. 2 shows a plan view of the other side of the opened sealing element according to the invention from FIG. 1.

FIGS. 1, 2 and 3 show an element 20, which can be used as a sealing element or a reinforcing element. It is not shown that this is arranged in a cavity, in particular in bodies and/or frames of means of transport and means of transportation, in particular of vehicles on water or on land, or of aircraft, particularly advantageously in a pillar of the body of the vehicle. However, it goes without saying that such an element 20 may be arranged in any cavity. The element 20 comprises a base element 1, also referred to hereafter as a base part, and one or more parts 2 of a foamable material. Such foamable materials are described in detail further below.

The foamable material 2 may be applied or fastened to the base part 1. This base part may consist of any desired materials, which are described in detail further below. The production of the element 20 is also described in detail further below. The foamable part may in this case cover the base part entirely or only partially and be divided into a number of parts.

The base part 1 of the element 20 may furthermore have at least one fastening means 3, in particular a clip, for the fastening and placement of the reinforcing element in a cavity. The fastening of the reinforcing element with a clip is suitable in particular for applications in which it is necessary that the entire surface of the component, that is to say also the inner wall of the cavity, can be reached, for example for dip coating. In such cases, fastening by adhesive bonding, for example, is not suitable, since the coating cannot reach the bonding location.

Figure 3A:
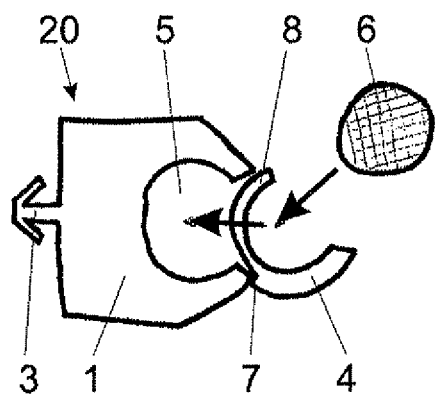
FIG. 3A shows a plan view of a sealing element according to the invention with the penetrating element not introduced.
Figure 3B:
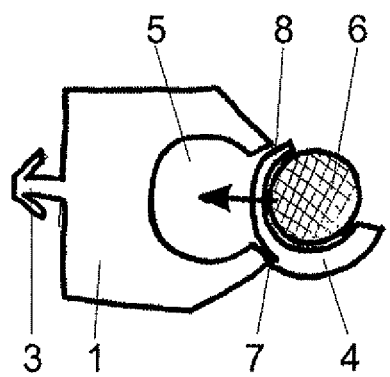
FIG. 3B shows a plan view of a sealing element according to the invention with the penetrating element positioned in the actuator.
Figure 3C:
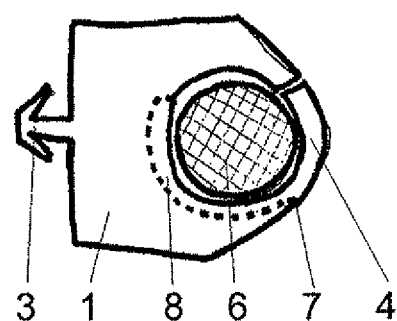
FIG. 3C shows a plan view of a sealing element according to the invention with the penetrating element introduced into the opening.
Figure 4:
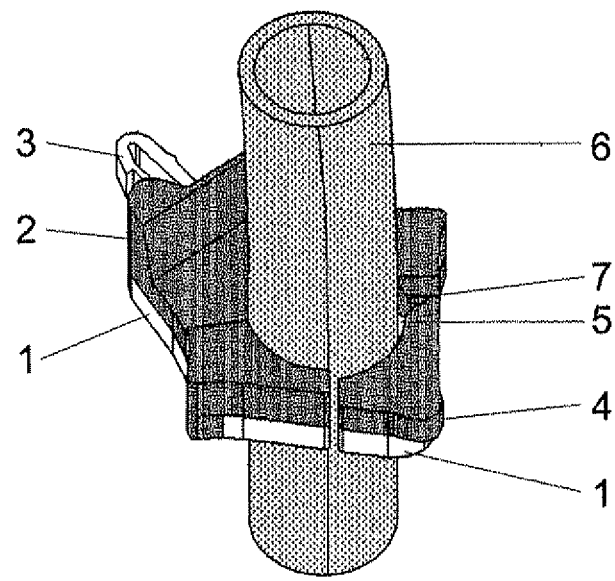
FIG. 4 shows a plan view of a closed sealing element according to the invention with a penetrating element.
Figure 5:
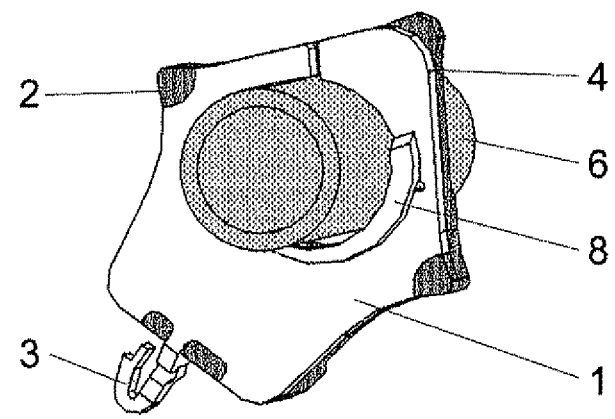
FIG. 5 shows a plan view of the other side of the closed sealing element according to the invention with a penetrating element from FIG. 4.

The base part 1 has an opening 5, which is open at the side and into which a penetrating element 6, shown in FIGS. 3, 4 and 5, can be introduced. The penetrating element is preferably a tubular element, particularly preferably a tube, in particular a water tube. The opening 5 is in this case preferably adapted essentially to the outer geometry of the penetrating element, so that, when the penetrating element has been introduced, it is held in the opening 5. Moreover, the foamable material is advantageously arranged in the region of the opening 5 in such a way that, during the foaming of the foamable material, the penetrating element is advantageously closed, and consequently so is the opening 5. In the case of tubular penetrating elements, the opening 5 is advantageously of a round configuration.

Arranged on the base part 1 is a wing 4, which can close the partially open opening 5, so that the penetrating element 6 is held in the opening 5. The wing 4 is connected to the base part 1 by means of a hinge 7. The hinge may itself be configured in any way desired. It is particularly advantageous, however, to make the wing from the same material as the base part and to form the hinge by means of a thin-walled connection, known as a film hinge. This allows the base part and the wing to be produced in the same cycle of the injection-moulding process. If the wing is produced from a different material than the base part, the hinge may also be configured in a known way, for example by bushes which are connected to a pin.

Arranged on the wing 4 is a actuator 8, which serves the purpose of taking the wing along with it when the penetrating element 6 is introduced into the opening 5 and closing the opening 5 by means of the wing. The actuator 8 may be produced from any desired materials and be fastened to the wing. As a particularly advantageous solution, however, as shown in the figures, the actuator consists of the same material as the wing 4 and is produced, in particular injection-moulded, directly with the wing. The actuator may be produced from foamable material if this has sufficient mechanical properties and if additional foamable material is required in the region of the opening 5, whereby any gaps between the penetrating element and the base part can be additionally closed during the foaming.

In FIGS. 3A to 3C it is schematically shown how the penetrating element is introduced into the opening 5 of the sealing element 20. According to FIG. 3A, the sealing element 20 is produced and supplied in the opened state.

According to FIG. 3B, the penetrating element 6 is positioned in the actuator 8 and the wing 4 and then, according to FIG. 3C, it is pressed into the opening 5 where the opening is open at the side. The open wing 4 is automatically closed by the actuator 8. The wing is held in the closed position by the actuator, since the actuator reaches around the penetrating element.

In FIGS. 4 and 5, the closed sealing element according to the invention is shown once again in detail with the penetrating element. It can be clearly seen how, in the case of the embodiment particularly preferred here, the penetrating element is held in the opening 5 by means of the actuator 8.

It is not shown that a locking device may be arranged on the wing and on the base part, acting in addition to the actuator to prevent the wing from opening again and the penetrating element falling out.

In addition, it is particularly advantageous, as also shown in the figures, to configure the opening 5 in such a way that the penetrating element is also held without the wing 4 and the actuator. The opening 5 is consequently advantageously open at the side only to the extent that the penetrating element can just about be pressed into the opening, but the opening that is open at the side closes at least partially around the penetrating element, in particular over more than half the circumference, after it has been pressed in, so that it is held.

Foamable Materials:

In principle, any desired material that can be made to foam in a controlled manner may be used as foamable material 2. This material may or may not at the same time have reinforcing properties. Typically, the foamable material is foamed thermally, by moisture or by electromagnetic radiation.

Such a foamable material typically has a chemical or physical foaming agent. Chemical foaming agents are organic or inorganic compounds which decompose under the influence of temperature, moisture or electromagnetic radiation, at least one of the decomposition products being a gas. Compounds which go over into the gaseous state of aggregation when the temperature is increased may be used, for example, as physical foaming agents. As a result, both chemical and physical foaming agents are capable of creating foam structures in polymers.

The foamable material is preferably foamed thermally, with chemical foaming agents being used. Suitable, for example, as chemical foaming agents are azodicarbonamides, sulphohydrazides, hydrogen carbonates or carbonates.

Suitable foaming agents are, for example, also commercially available under the trade name Expancel® from the Akzo Nobel company, the Netherlands, or under the trade name Celogen® from the Chemtura Corp., USA.

The heat required for the foaming may be introduced by external or internal heat sources, such as an exothermal chemical reaction. The foamable material is preferably foamable at a temperature of ≤160° C., in particular of 80° C. to 150° C., preferably of 90° C. to 140° C.

Suitable, for example, as foamable materials are single-component epoxy resin systems which do not flow at room temperature, have in particular increased impact resistance and contain thixotropic agents such as aerosils or nanoclays. For example, such epoxy resin systems comprise 20 to 50% by weight an epoxy liquid resin, 0 to 30% by weight an epoxy solid resin, 5 to 30% by weight impact modifiers, 1 to 5% by weight physical or chemical foaming agents, 10 to 40% by weight fillers, 1 to 10% by weight thixotropic agents and 2 to 10% by weight heat-activatable catalysts. Apart from epoxy solid resins, crystalline polyepoxides such as triglycidyl isocyanurates, terephthalic acid diglycidyl ethers, mixtures of terephthalic acid diglycidyl ether with trimellitic acid triglycidyl ether, hydroquinone diglycidyl ether and adducts of trimethylolpropane diglycidyl ether with diisocyanates such as 4,4'-, 2,4'- and 2,2'-diphenyl methane diisocyanate (MDI), 2,4, and 2,6-toluene diisocyanate (TDI) or 1-isocyanato-3,3,5-trimethyl-5-isocyanatomethyl-cyclohexane (IPDI), are also suitable. Suitable as impact modifiers are reactive liquid rubbers based on nitrile rubber or derivatives of polyether-polyol polyurethanes, core-shell polymers and similar systems known to a person skilled in the art.

Likewise suitable foamable materials are single-component polyurethane compositions containing foaming agents based on crystalline polyesters having OH groups mixed with further polyols, preferably polyether polyols, and polyisocyanates with blocked isocyanate groups. The melting point of the crystalline polyester should be ≥50° C. The isocyanate groups of the polyisocyanate may, for example, be blocked by nucleophiles such as caprolactam, phenols or benzoxalones. Also suitable are blocked polyisocyanates such as are used, for example, in powder coating technology and are commercially available, for example, under the trade names Vestagon® BF 1350 and Vestagon® BF 1540 from Degussa GmbH, Germany. As isocyanates, there are likewise so-called encapsulated or surface-deactivated polyisocyanates, which are known to a person skilled in the art and are described, for example, in EP 0 204 970.

Also suitable as foamable materials are two-component epoxy/polyurethane compositions containing foaming agents, such as are described, for example, in WO 2005/080524 A1, the disclosure of which is hereby incorporated.

Likewise suitable foamable materials are sold, for example, under the trade name SikaBaffle® 240, SikaBaffle® 250 or SikaBaffle® 255 by the Sika Corp., USA, and are described in the U.S. Pat. Nos. 5,266,133 and 5,373,027, the disclosure of which is hereby incorporated. Such foamable materials are particularly preferred for the present invention.

Preferred as foamable materials with reinforcing properties are, for example, those that are sold under the trade name SikaReinforcer® 941 by the Sika Corp., USA. These are described in U.S. Pat. No. 6,387,470, the disclosure of which is hereby incorporated.

Base Material

The base part may consist of any desired materials. Preferred materials are plastics, in particular polyurethanes, polyamides, polyesters and polyolefins, preferably high temperature resistant polymers such as poly(phenylene ethers), polysulphones or polyether sulphones, which are in particular also foamed; metals, in particular aluminium and steel; or any desired combinations of these materials. Used with particular preference is polyamide, in particular polyamide 6, polyamide 6,6, polyamide 11, polyamide 12 or a mixture thereof.

Furthermore, the base part 1 may have any desired construction and any desired structure. It may, for example, be solid, hollow or foamed or have a grid-like structure. The surface of the base part may typically be smooth, rough or structured.

In addition to its function as a base for the foamable material, the base part 1 may contribute to the structural reinforcement or the sealing of the component or else to the noise damping.

In the case of sealing and reinforcing elements according to the invention, in which the foamable material is located on a base part, the production method differs according to whether or not the base part consists of a material that can be processed by injection moulding. If this is the case, usually a two-component injection-moulding process is used. In this case, firstly a first component, in this case the base part, is moulded. Once this first component has solidified, the cavity in the mould is enlarged, or adapted, or the moulding produced is placed into a new mould, and a second component, in this case the foamable material, is moulded onto the first component by a second injection unit. If the base part consists of a material which cannot be produced by the injection-moulding process, that is for example from a metal, the base part is placed into a corresponding mould and the foamable material is moulded onto the base part.

It goes without saying that there is also the possibility of fastening the foamable material to a base part by any other fastening means or methods desired.

LIST OF DESIGNATIONS 1 base element, part
2 foamable element/part
3 fastening element
4 wing
5 opening
6 penetrating element
7 hinge
8 actuator
20 element

The invention claimed is:

1. An element for sealing or reinforcing a cavity of a structural element, the element comprising:
    a base element;
    a wing movably connected to the base element to form an opening for receiving a penetrating element:
    a foamable element comprised of a foaming agent and arranged on the base element and the wing; and
    an actuator protrusion connected to the wing;
    wherein the actuator protrusion moves the wing from an open position to a closed position when the penetrating element is inserted into the opening.

2. A reinforcing system including the element according to claim 1, wherein the wing is movably connected to the base element by a hinge.

3. A reinforcing system including the element according to claim 1, wherein the wing is held in a closed position by the actuator protrusion, and/or additionally arranged on the base element is a locking device for locking the wing in the closed position.

4. A reinforcing system including the element according to claim 1, wherein the wing is configured to enclose more than half the circumference of the penetrating element.

5. A reinforcing system including the element according to claim 1, wherein the foamable element consists of foamable material that covers the entire base element.

6. A reinforcing system including the element according to claim 1, wherein the foamable element consists of foamable material that partially covers the base element.

7. The reinforcing system according to claim 5, wherein the foamable material is foamed thermally at a temperature of ≤160° C.

8. The element according to claim 1, wherein the foaming agent consists of a single-component epoxy resin system.

9. The element according to claim 1, wherein the foaming agent consists of a single-component polyurethane composition.

10. The element according to claim 1, wherein the foaming agent consists of a two-component epoxy resin and polyurethane composition.

11. A reinforcing system including the element according to claim 1, wherein at least one of the base element, the wing, and the actuator is constructed from a plastic, a metal, or a combination of plastic and metal.

12. A reinforcing system including the element according to claim 1, wherein the base element has a fastening means for placing and fastening the penetrating element in a cavity.

13. A reinforced cavity of a structural component in a body and/or a frame of an air, water or land transport vehicles comprising the element of claim 1.

14. A method for introducing a penetrating element into an element for sealing or reinforcing a cavity of a structural element, the method comprising:
    providing an element for sealing or reinforcing a cavity of a structural element comprising:
        a base element,
        a wing movably connected to the base element to form an opening for receiving the penetrating element:
        a foamable element comprised of a foaming agent and arranged on the base element and the wing, and
        an actuator protrusion connected to the wing;
    introducing the penetrating element into the opening; and
    pressing the penetrating element against the actuator protrusion;
    wherein pressing the penetrating element against the actuator protrusion causes the wing to move from an open position to a closed position.

15. The method according to claim 14, further comprising enclosing more than half the circumference of the penetrating element with the wing.

16. The method according to claim 14, further comprising holding the wing in a closed position by the actuator protrusion.

17. The method according to claim 14, comprising providing the penetrating element as a tubular element.

\* \* \* \* \*